United States Patent
Cho

(10) Patent No.: US 11,601,913 B2
(45) Date of Patent: Mar. 7, 2023

(54) METHOD AND APPARATUS FOR POSITIONING

(71) Applicant: Locaila, Inc, San Jose, CA (US)

(72) Inventor: Jaihyung Cho, Daejeon (KR)

(73) Assignee: Locaila, Inc, San Jose, CA (US)

( * ) Notice: Subject to any disclaimer, the term of this patent is extended or adjusted under 35 U.S.C. 154(b) by 227 days.

(21) Appl. No.: 17/214,962

(22) Filed: Mar. 29, 2021

(65) Prior Publication Data

US 2022/0312361 A1      Sep. 29, 2022

(51) Int. Cl.
G01S 5/04        (2006.01)
G01S 5/00        (2006.01)
H04W 64/00       (2009.01)
G01S 5/02        (2010.01)

(52) U.S. Cl.
CPC .......... *H04W 64/003* (2013.01); *G01S 5/009* (2013.01); *G01S 5/0036* (2013.01); *G01S 5/0246* (2020.05); *G01S 5/04* (2013.01)

(58) Field of Classification Search
None
See application file for complete search history.

(56) References Cited

U.S. PATENT DOCUMENTS 6,882,314 B2 *  4/2005  Zimmerman  ........... G01S 19/41
                                              342/464
10,809,351 B1   10/2020 Cho 2016/0006557 A1   1/2016  Shirakawa et al.
2017/0164323 A1   6/2017  Markhovsky et al.
2017/0269216 A1*  9/2017  Dai .................... G01S 19/25
2020/0120682 A1   4/2020  Li et al.

FOREIGN PATENT DOCUMENTS

CN      110231638 B  *  6/2021  ............. G01S 19/44
CN      111435159 B  *  3/2022  ............. G01S 5/021
WO      2019141090 A1    7/2019
WO   WO-2019221747 A1 * 11/2019  ............. G01S 13/74

OTHER PUBLICATIONS

PCT/ISA/210, ISA/US, International Search Report Issued on Application PCT/US2021/048293, dated Feb. 22, 2022, 4 pages.
PCT/ISA/237, ISA/US, International Written Opinion Issued on Application PPCT/US2021/048293, dated Feb. 22, 2022, 7 pages.

* cited by examiner

*Primary Examiner* — Ajit Patel
(74) *Attorney, Agent, or Firm* — Nicholas Park

(57) ABSTRACT

Provided is a positioning method performed by a user equipment (UE). The positioning method includes receiving reference signals from a plurality of base stations; acquiring phase difference information depending on a wavelength of at least one subcarrier among subcarriers included in the reference signals; calculating first estimated coordinates of the UE based on first phase difference information depending on a wavelength of a first subcarrier among the subcarriers; and calculating a first travel distance difference between the reference signals from the first estimated coordinates and estimating integer ambiguity of a second phase difference depending on a wavelength of a second subcarrier from the first travel distance difference.

18 Claims, 7 Drawing Sheets

METHOD AND APPARATUS FOR POSITIONING

BACKGROUND

1. Field

The present disclosure of the following description relates to a method and apparatus for measuring a position of a user equipment (UE) using a wireless signal.

2. Related Art

A communication system may include a core network, for example, a mobility management entity (MME), a serving gateway (SGW), a packet data network (PDN) gateway (PGW), a base station (e.g., a macro base station, a small base station, and a relay), a user equipment (UE), and the like. Communication between the base station and the UE may be performed using a variety of radio access technology (RAT), for example, 4-th generation (4G) communication technology, 5-th generation (5G) communication technology, wireless broadband (WiBro) technology, wireless local area network (WLAN) technology, and wireless personal area network (WPAN) technology.

A UE and a base station may mutually transmit and receive reference signals. As another example, different two base stations may exchange reference signals with each other. A reference signal may be used for various purposes. For example, a UE or a base station may perform synchronization or estimate a position of the UE based on the reference signal. As one of positioning methods using radio access technology (RAT), the UE may perform positioning based on a difference in time of arrival between positioning reference signals (PRSs) received at the UE from a plurality of base stations or a reception phase difference of a reference signal.

In the case of performing positioning based on the reception phase difference of the reference signal, an integer ambiguity issue may occur. The smaller a wavelength of the reference signal is set, a positioning precision for a phase or a phase difference may be improved. On the contrary, a period of a corresponding phase value or a corresponding phase difference may become ambiguous. That is, as the positioning precision for the phase or the phase difference is improved, it becomes more difficult to determine the integer ambiguity.

SUMMARY

At least one example embodiment provides a method and apparatus for improving a positioning performance by determining a phase of a wireless signal with high precision and by determining integer ambiguity for a phase difference with high precision.

According to an aspect, there is provided a positioning method performed by a user equipment (UE), the positioning method including receiving reference signals from a plurality of base stations; acquiring phase difference information depending on a wavelength of at least one subcarrier among subcarriers included in the reference signals; calculating first estimated coordinates of the UE based on first phase difference information depending on a wavelength of a first subcarrier among the subcarriers; and calculating a first travel distance difference between the reference signals from the first estimated coordinates and estimating integer ambiguity of a second phase difference depending on a wavelength of a second subcarrier from the first travel distance difference.

The positioning method may further include calculating $k^{th}$ estimated coordinates based on $k^{th}$ phase difference information depending on a wavelength of a $k^{th}$ subcarrier; and calculating a $k^{th}$ travel distance difference from the $k^{th}$ estimated coordinates and estimating integer ambiguity of a (k+1)-th phase difference depending on a wavelength of a (k+1)-th subcarrier from the $k^{th}$ travel distance difference. The calculating of the $k^{th}$ estimated coordinates and the estimating of the integer ambiguity of the (k+1)-th phase difference may be repeated until a preset termination condition is met.

Here, k denotes a natural number.

The wavelength of the (k+1)-th subcarrier may be shorter than the wavelength of the $k^{th}$ subcarrier.

The positioning method may further include acquiring phase difference information depending on a wavelength of a carrier included in the reference signals; estimating integer ambiguity of a phase difference depending on the wavelength of the carrier based on a travel distance difference that is acquired from a phase difference depending on a wavelength of a subcarrier having a longest wavelength among the subcarriers; and calculating a position of the UE based on a phase difference depending on the wavelength of the carrier.

The calculating of the $k^{th}$ estimated coordinates may include calculating initial estimated coordinates of the UE from the $k^{th}$ phase difference information; and modifying the initial estimated coordinates through an iterative operation and calculating the $k^{th}$ estimated coordinates.

The modifying of the initial estimated coordinates and the calculating of the $k^{th}$ estimated coordinates may include calculating an $n^{th}$ travel distance difference between the reference signals from $n^{th}$ estimated coordinates and calculating (n+1)-th estimated coordinates modified from the $n^{th}$ estimated coordinates based on an error between the $n^{th}$ travel distance difference and a travel distance difference corresponding to the $k^{th}$ phase difference, and the calculating of the $n^{th}$ travel distance difference and the calculating of the (n+1)-th estimated coordinates may be repeated until a preset termination condition is met.

The calculating of the $n^{th}$ travel distance difference and the calculating of the (n+1)-th estimated coordinates may be repeated until an error between the $n^{th}$ estimated coordinates and the (n+1)-th estimated coordinates becomes to be less than a preset tolerance.

The (n+1)-th estimated coordinates may depend on a product of a partial differential coefficient matrix for a travel distance difference between the reference signals and the error between the $n^{th}$ travel distance difference and the travel distance difference corresponding to the $k^{th}$ phase difference.

The acquiring of the phase difference information depending on the wavelength of at least one subcarrier among the subcarriers may include acquiring a first sample vector based on received data of a first reference signal and acquiring a second sample vector based on received data of a second reference signal; calculating a first phase vector and a second phase vector by performing an inner product of a discrete Fourier transform (DFT) coefficient vector with respect to each of the first sample vector and the second sample vector; calculating a third phase vector by conjugating a 1-1 partial vector corresponding to a first portion of the first phase vector and a 1-2 partial vector corresponding to a second portion of the first phase vector; calculating a fourth phase vector by conjugating a 2-1 partial vector corresponding to a first portion of the second phase vector and a 2-2 partial vector corresponding to a second portion of the second phase vector; and acquiring phase difference information depending on the wavelength of at least one subcarrier among the subcarriers by conjugating the third phase vector and the fourth phase vector.

The acquiring of the phase difference information depending on the wavelength of the carrier included in the reference signals may include acquiring a first sample vector based on received data of a first reference signal and acquiring a second sample vector based on received data of a second reference signal; calculating a first phase vector and a second phase vector by performing an inner product of a DFT coefficient vector with respect to each of the first sample vector and the second sample vector; and acquiring phase difference information depending on the wavelength of the carrier from a conjugate product of the first phase vector and the second phase vector.

According to another aspect, there is provided a positioning apparatus including a communicator; and a processor configured to connect to the communicator. The processor is configured to perform a process of receiving reference signals from a plurality of base stations, a process of acquiring phase difference information depending on a wavelength of at least one subcarrier among subcarriers included in the reference signals, a process of calculating first estimated coordinates of a user equipment (UE) based on first phase difference information depending on a wavelength of a first subcarrier among the subcarriers, and a process of calculating a first travel distance difference between the reference signals from the first estimated coordinates and estimating integer ambiguity of a second phase difference depending on a wavelength of a second subcarrier from the first travel distance difference.

According to at least one example embodiment, a UE may readily calculate a phase difference depending on a wavelength of a subcarrier or a carrier of reference signals. According to at least one example embodiment, a UE may improve positioning precision by estimating a position of the UE through an iterative operation using a phase difference depending on wavelengths of a plurality of subcarriers or carriers. According to at least one example embodiment, the UE may determine integer ambiguity of a phase difference of a subcarrier or a carrier having a relatively small wavelength based on a phase difference of a subcarrier having a relatively large wavelength. According to at least one example embodiment, the UE may improve positioning precision by modifying an estimated position using a partial differential coefficient matrix.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

DETAILED DESCRIPTION

Figure 1:
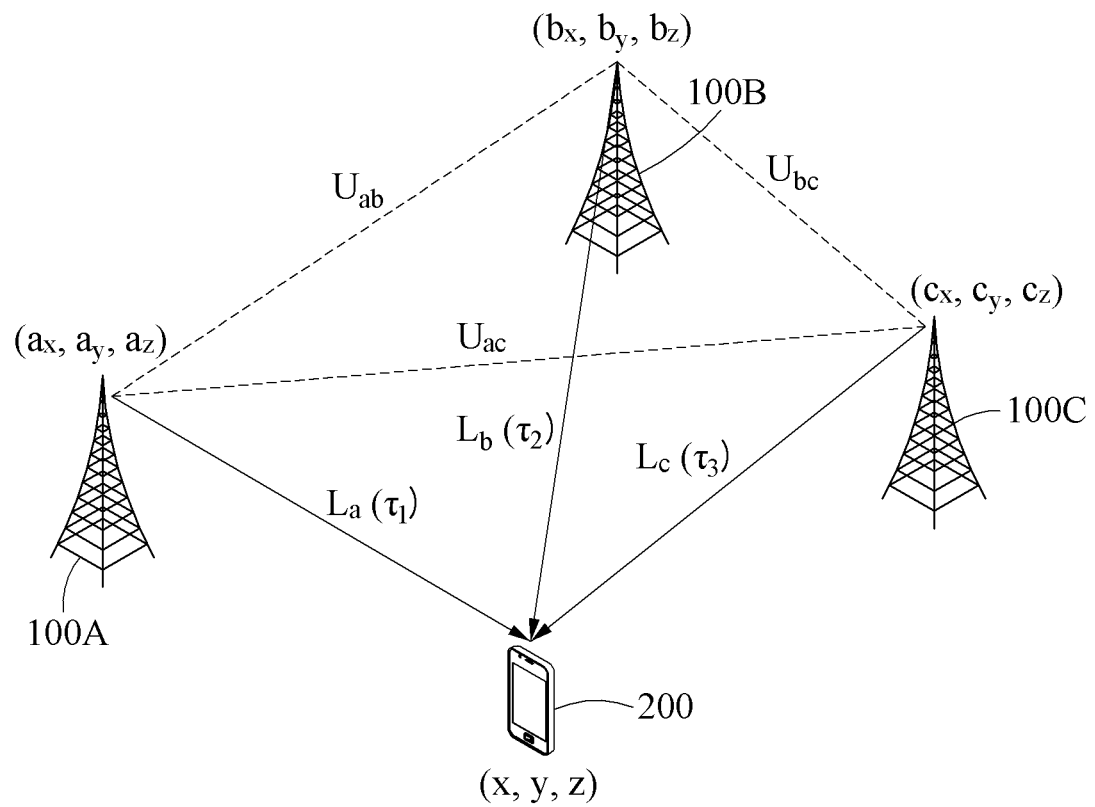
FIG. 1 illustrates an example of a communication system according to an example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first," "second," etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "coupled to" another component, the component may be directly connected to or coupled to the other component, or one or more other intervening components may be present. In contrast, when a component is referred to as being "directly connected to" or "directly coupled to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

Herein, although it is described that a reference signal is used for positioning of a user equipment (UE), it is provided as an example only. The reference signal may be used for synchronization of a UE or a base station. Also, although description is made based on an example in which the base station transmits a reference signal to the UE, it is provided as an example only. For example, the UE may transmit the reference signal to the base station.

FIG. 1 illustrates an example of a communication system according to at least one example embodiment.

Referring to FIG. 1, the communication system may include a first base station 100A, a second base station 100B, and a third base station 100C. Each of the first base station 100A, the second base station 100B, and the third base station 100C may also be referred to as a node base (NodeB), a next generation NodeB, an evolved NodeB, gnodeB, a base transceiver station (BTS), a radio base station, a radio transceiver, an access point, an access node, a road side unit (RSU), a radio remote head (RRH), a transmission point (TP), a transmission and reception point (TRP), a relay node, and the like. The UE 200 may also be referred to as a terminal, an access terminal, a mobile terminal, a station, a subscriber station, a mobile station, a portable subscriber station, a node, a device, and the like.

Although FIG. 1 illustrates three base stations as an example, it is provided as an example only. The UE 200 may receive a reference signal from two or three or more base stations during a positioning process.

Figure 2:
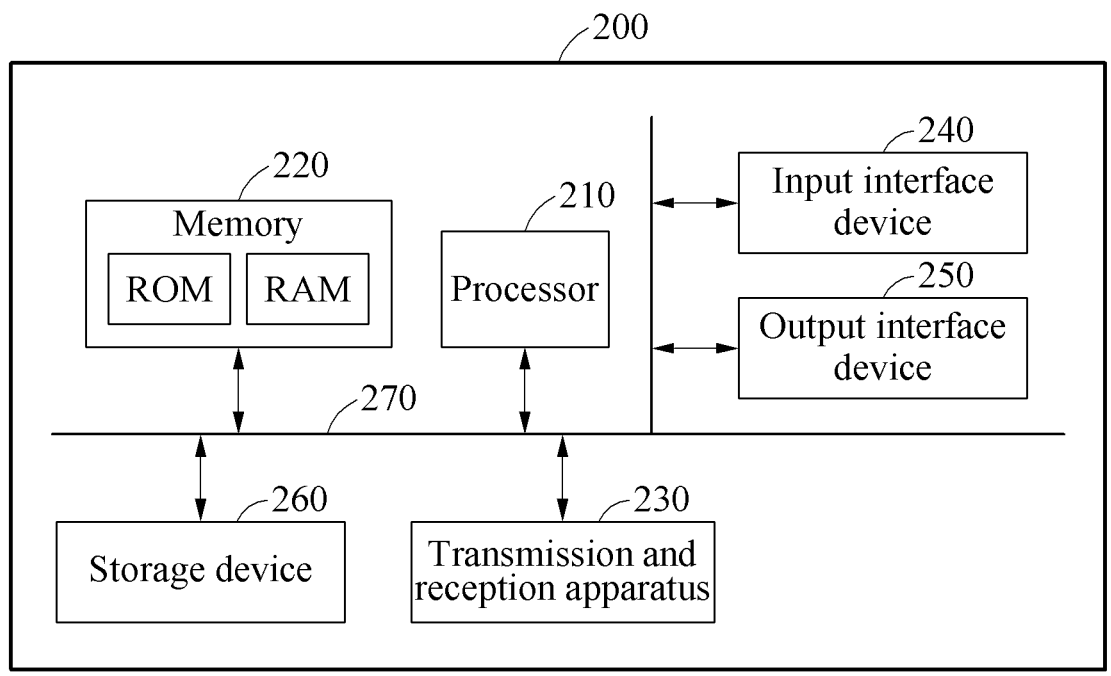
FIG. 2 is a diagram illustrating an example of a configuration of a communication node included in a communication system according to an example embodiment.

FIG. 2 is a diagram illustrating an example of a configuration of a communication node included in a communication system according to at least one example embodiment. Reference numeral "200" used for the UE of FIG. 1 is also used to represent the communication node of FIG. 2. A configuration of FIG. 2 may also apply to the first base station 100A, the second base station 100B, and the third base station 100C.

Referring to FIG. 2, the communication node 200 may include at least one processor 210, a memory 220, and a transmission and reception apparatus 230 configured to perform communication through connection to a network. Also, the communication node 200 may further include an input interface device 240, an output interface device 250, and a storage device 260. The components included in the communication node 200 may communicate with each other through connection to a bus.

The processor 210 may execute a program command stored in at least one of the memory 220 and the storage device 260. The processor 210 may refer to a central processing unit (CPU), a graphics processing unit (GPU), or an exclusive processor that performs methods according to example embodiments. Each of the memory 220 and the storage device 260 may be configured as at least one of a volatile storage medium and a nonvolatile storage medium. For example, the memory 220 may be configured as at least one of read only memory (ROM) and random access memory (RAM).

Referring again to FIG. 1, the first base station 100A may transmit a first reference signal to the UE 200, the second base station 100 may transmit a second reference signal to the UE 200, and the third base station 100C may transmit a third reference signal to the UE 200. Position coordinates of the first base station 100A may be ($a_x$, $a_y$, $a_z$), position coordinates of the second base station 100B may be ($b_x$, $b_y$, $b_z$), position coordinates of the third base station 100C may be ($c_x$, $c_y$, $c_z$), and position coordinates of the UE 200 may be (x, y, z). In the case of considering only two-dimensional (2D) coordinates for clarity of description, a travel distance ($L_a$) of the first reference signal, a travel distance ($L_b$) of the second reference signal, and a travel distance ($L_c$) of the third reference signal may be represented as Equation 1.

$$L_a = \sqrt{(a_x-x)^2+(a_y-y)^2}$$

$$L_b = \sqrt{(b_x-x)^2+(b_y-y)^2}$$

$$L_c = \sqrt{(c_x-x)^2+(c_y-y)^2} \quad \text{[Equation 1]}$$

Equation 1 is merely provided as an example for clarity of description. For example, a travel distance of a reference signal may be calculated based on three-dimensional (3D) coordinates. Also, if a travel path of the reference signal is not straight, Equation 1 may be modified within the range that is easy to those skilled in the art to modify the travel path to be straight.

The UE 200 may calculate a travel distance difference between reference signals by receiving the reference signals and by measuring a phase difference between the reference signals. The UE 200 may calculate a difference between the travel distance ($L_a$) and the travel distance ($L_b$) based on a phase difference between the first reference signal and the second reference signal. As another example, the UE 200 may calculate a difference between the travel distance ($L_b$) and the travel distance ($L_c$) based on a phase difference between the second reference signal and the third reference signal. The UE 200 may estimate a position of the UE 200 based on a travel distance difference between reference signals.

Positioning performance of the UE 200 may depend on phase positioning precision of the UE 200. However, in general, it is not easy for the UE 200 to calculate a phase difference between reference signals. Since a codomain of the phase difference is $-\pi \sim +\pi$ (or $0 \sim 2\pi$), an integer ambiguity issue may occur.

Figure 3:
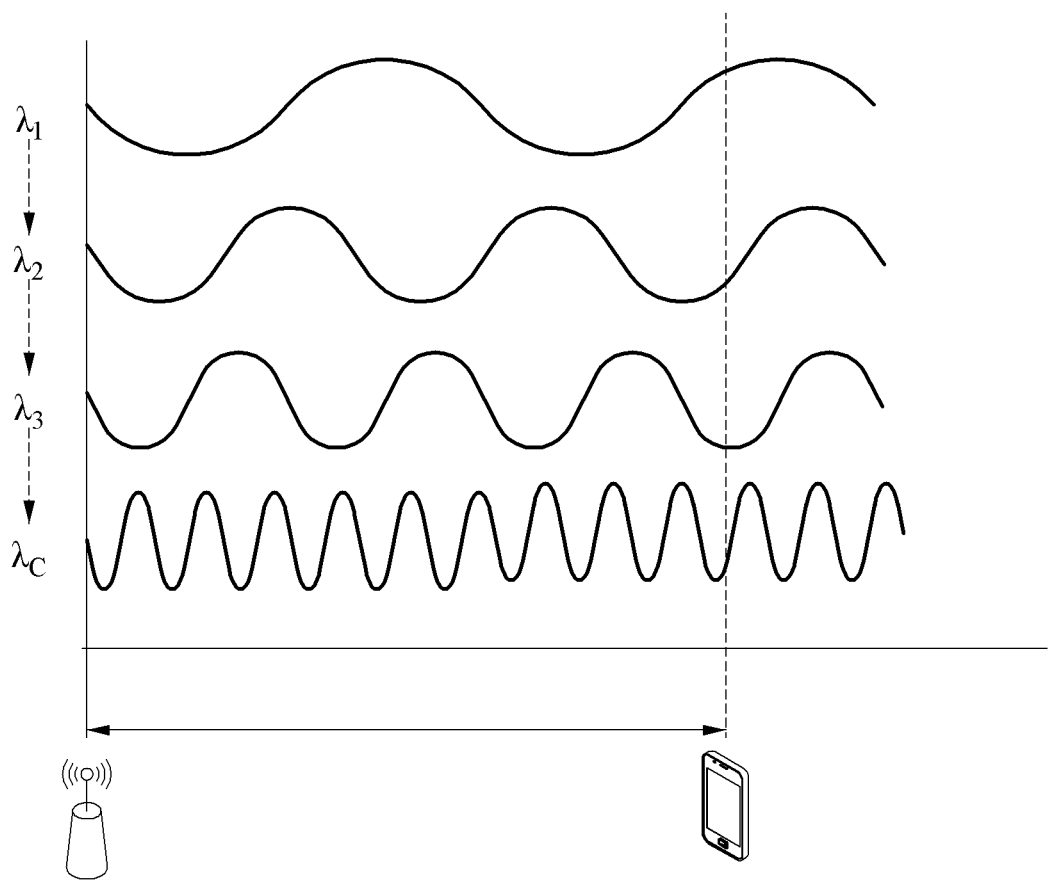
FIG. 3 illustrates an example of a relationship between an amplitude and a phase of a signal wavelength measured by a UE according to an example embodiment.

FIG. 3 illustrates an example of a relationship between an amplitude and a phase of a signal wavelength measured by the UE 200 according to an example embodiment.

Referring to FIG. 3, if a wavelength of a signal measured by the UE 200 is large, a number of times the wavelength of the signal is repeated between a base station and the UE 200 may decrease. Therefore, estimation of integer ambiguity may become easy. Also, if the wavelength of the signal measured by the UE 200 is large, a phase may change insensitively according to a change in a position of the UE 200. Therefore, positioning resolution may decrease. In contrast, if the wavelength of the signal measured by the UE 200 is small, a number of times the wavelength of the signal is repeated may increase. Therefore, estimation of integer ambiguity may become difficult. Also, if the wavelength of the signal measured by the UE 200 is small, a phase may change sensitively according to a change in a position of the UE 200. Therefore, positioning resolution may increase.

Table 1 shows specifications of carriers and subcarriers that constitute a reference signal.

TABLE 1

| Frequency of (sub)carrier | Sampling rate (1/$T_s$) | 1/$N_{FFT}$ | Wavelength of (sub)carrier | Note |
|---|---|---|---|---|
| 800 MHz | — | — | 0.375 m | c/800e6 Hz (c = 299, 792, 458 m/sec) |

TABLE 1-continued

| Frequency of (sub)carrier | Sampling rate (1/T_s) | 1/N_{FFT} | Wavelength of (sub)carrier | Note |
|---|---|---|---|---|
| 3.5 GHz | — | — | 0.087 m | c/3.5e9 |
| 977 KHz | 10 MHz | 100/1024 | 307 m | (c/10e6)*(1024/100), cp excluded. |
| 488 KHz | 10 MHz | 100/2048 | 614 m | (c/10e6)*(2048/100) |
| 2.9 MHz | 30 MHz | 100/1024 | 102 m | (c/30e6)*(1024/100) |
| 1.5 MHz | 30 MHz | 100/2048 | 205 m | (c/30e6)*(2048/100) |
| 14.6 MHz | 30 MHz | 1000/2048 | 20 m | (c/30e6)*(2048/1000) |

In Table 1, a first column represents a frequency of a carrier or a subcarrier, a second column represents a sampling rate, a third column represents an inverse number of a fast Fourier transform (FFT) size ($N_{FFT}$), a fourth column represents a wavelength of a carrier or a subcarrier, and a fifth column briefly represents a calculation process for a value of the fourth column.

In Table 1, a second row and a third row represent specifications of a carrier signal. In the case of a carrier, a frequency and a wavelength are not associated with a sampling rate and an FFT size and thus a corresponding field is marked blank.

Referring to Table 1, it can be verified that the carrier generally has a frequency higher than a frequency of the subcarrier and thus, a wavelength is relatively short. That is, when the UE 200 uses a phase difference depending on the wavelength of the carrier, the phase difference is sensitive to a position of the UE 200, which may lead to increasing a positioning resolution. However, it may be difficult for the UE 200 to determine integer ambiguity of the phase difference depending on the wavelength of the carrier.

In general, the wavelength of the subcarrier may be larger than the wavelength of the carrier. The wavelength and the frequency of the subcarrier may variously vary based on the sampling rate and the FFT size. Referring to Table 1, the wavelength of the subcarrier may variously vary from 614 m to 20 m. When the wavelength of the subcarrier is 614 m and an interval between base stations is 1 km, a number of cases of determining the integer ambiguity may be 2 or less. Therefore, the UE 200 may easily determine the integer ambiguity. However, in this case, a positioning resolution of the UE 200 may decrease. When the wavelength of the subcarrier is 20 m, a number of cases of determining the integer ambiguity may increase and it may be difficult for the UE 200 to determine the integer ambiguity. However, in this case, the positioning resolution of the UE 200 may relatively increase.

Figure 4:
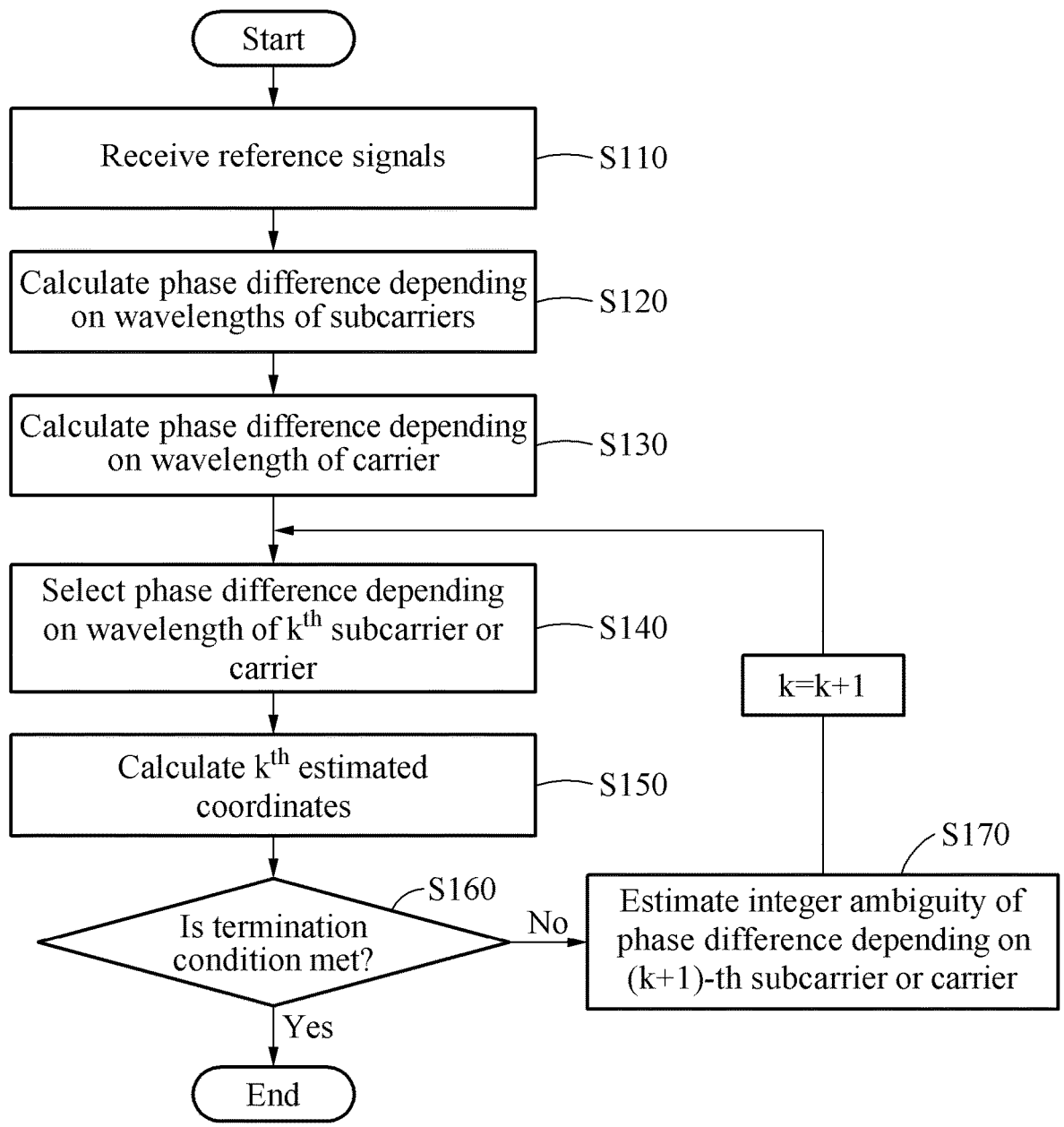
FIG. 4 is a flowchart illustrating an example of a positioning method of a UE according to an example embodiment.

FIG. 4 is a flowchart illustrating an example of a positioning method of the UE 200 according to an example embodiment.

Referring to FIG. 4, in operation S110, the UE 200 may receive reference signals from base stations, for example, the first base station 100A, the second base station 100B, and the third base station 100C. The UE 200 may acquire received data of the reference signals at a plurality of sample times.

In operation S120, the UE 200 may calculate a phase difference depending on wavelengths of subcarriers included in the reference signals.

Hereinafter, for clarity of description, description is made based on an example of calculating a phase difference between a first reference signal received at the UE 200 from the first base station 100A and a second reference signal received at the UE 200 from the second base station 100B.

In a similar manner, the UE 200 may calculate a phase difference between the first reference signal and a third reference signal, a phase difference between the second reference signal and the third reference signal, a phase difference between the third reference signal and a fourth reference signal, and the like. The following equations are merely provided to help the understanding of example embodiments and may be modified within the range easily changed by those skilled in the art.

Figure 5:
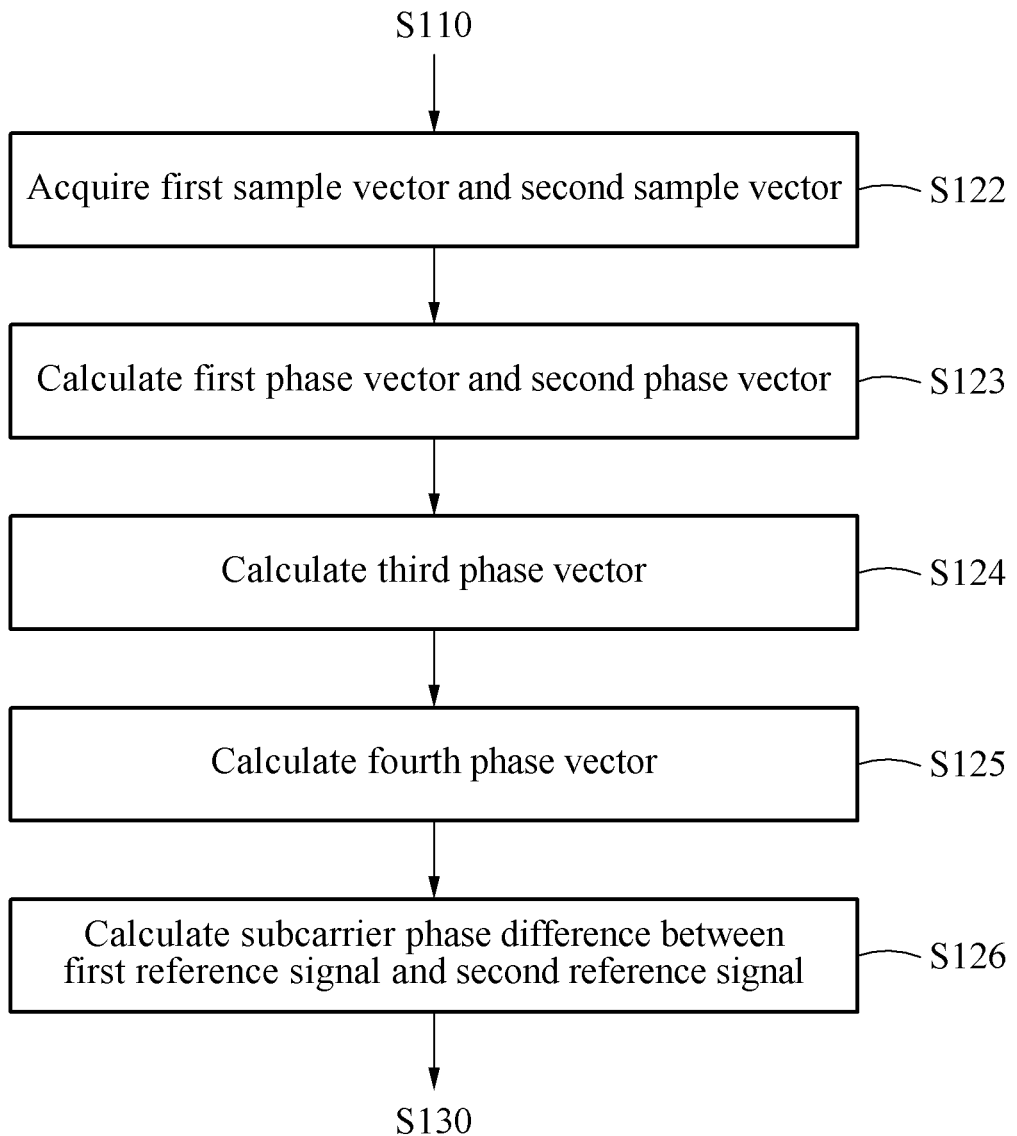
FIG. 5 is a flowchart illustrating an example of a process of performing operation S120 of FIG. 4.

FIG. 5 is a flowchart illustrating an example of a process of performing operation S120 of FIG. 4.

Referring to FIG. 5, in operation S122, the UE 200 may acquire a first sample vector from the received data of the first reference signal and may acquire a second sample vector from the received data of the second reference signal.

A baseband of the first reference signal transmitted from the first base station 100A at a time t may be represented as Equation 2.

$$B_a(t) = A_1 e^{i\omega_1 t} + A_2 e^{i\omega_2 t} + \ldots + A_m e^{i\omega_m t} = \sum_{q=1}^{m} A_q e^{i\omega_q t} \quad [\text{Equation 2}]$$

In Equation 2, $B_a(t)$ denotes the first reference signal transmitted in the baseband at the time t, and $A_q$ denotes an amplitude and initial phase component of a subcarrier signal having an angular frequency $\omega_q$. The first base station 100A may modulate a baseband signal of the first reference signal to a passband signal using a carrier signal having an angular frequency $\omega_c$ and may transmit the modulated passband signal. Likewise, the second base station 100B may modulate a baseband signal of the second reference signal to a passband signal and may transmit the modulated passband signal.

The first reference signal modulated to the passband signal may be represented as Equation 3.

$$\begin{aligned}S_a(t) &= B_a(t) \cdot e^{i\omega_c t} \\ &= \left(A_1 e^{i\omega_1 t} + A_2 e^{i\omega_2 t} + \ldots + A_m e^{i\omega_m t}\right) \cdot e^{i\omega_c t} \\ &= \sum_{q=1}^{m} A_q e^{i(\omega_c + \omega_q)t}\end{aligned} \quad [\text{Equation 3}]$$

In Equation 3, $S_a(t)$ denotes the first reference signal modulated to the passband signal, and $\omega_c$ denotes the angular frequency of the carrier. The time t may refer to a time within a time interval in which the first reference signal is transmitted. For example, if the reference signal continues during n symbol periods, t may be one of values between 0 and $n \times (T_u + T_{CP})$.

The first reference signal of the passband may arrive at the UE 200 through a straight path when an obstacle is absent between the first base station 100A and the UE 200 and may arrive at the UE 200 through a multipath when the obstacle is present between the first base station 100A and the UE 200. For example, when the first reference signal arrives at the UE 200 through propagation during a time $\tau_{a1}$, the reference signal received at the UE 200 may be represented as Equation 4.

$$S_a(t - \tau_{a1}) = \sum_{q=1}^{m} A_q e^{i(\omega_c + \omega_q)(t - \tau_{a1})} = e^{i\omega_c(t - \tau_{a1})} \sum_{q=1}^{m} A_q e^{i\omega_q(t - \tau_{a1})} \quad [\text{Equation 4}]$$

The UE 200 may demodulate, to the baseband signal, the first reference signal of the passband in Equation 4. The UE 200 may multiply the passband signal received at the UE 200 by a factor for eliminating the angular frequency component $\omega_c$ of the carrier. This process may be represented as Equation 5.

$$y_a(t) = e^{-i\omega_c(t-\epsilon)} \cdot S_a(t - \tau_{a1}) \quad \text{[Equation 5]}$$

$$= e^{-i\omega_c(t-\epsilon)} \cdot e^{i\omega_c(t-\tau_{a1})} \sum_{q=1}^{m} A_q e^{i\omega_q(t-\tau_{a1})}$$

$$= e^{-i\omega_c(\tau_{a1}-\epsilon)} \cdot \sum_{q=1}^{m} A_q e^{i\omega_q(t-\tau_{a1})}$$

In Equation 5, $y_a(t)$ denotes a result of transforming the first reference signal received at the UE 200 to the baseband signal, and $\epsilon$ denotes a local clock error that occurs due to mismatch between a clock of a receiving (Rx) UE and a clock of a transmitting (Tx) base station.

The UE 200 may extract a first sample vector based on received data of reference signals received at a plurality of points in times. The UE 200 may acquire the first sample vector by transforming first reference signals received at a plurality of points in times to baseband signals. For example, the UE 200 may extract the first sample vector by transforming first reference signals received at N points in times to baseband signals. In a typical orthogonal frequency division multiplexing (OFDM) system, a value of N may be determined based on a size of a fast Fourier transform (FFT) window. The first sample vector may be represented as Equation 6.

$$Y_a(t) = \begin{bmatrix} y_a(t) \\ y_a(t-1) \\ \vdots \\ y_a(t-N+1) \end{bmatrix} \quad \text{[Equation 6]}$$

In Equation 6, $Y_a(t)$ denotes the first sample vector that includes samples of the first reference signal received at the UE 200 at N sample times. If the waveform of the first reference signal continues during a plurality of symbol periods, the UE 200 may readily acquire a plurality of sample vectors by changing t of Equation 6 without considering a boundary between symbols.

In operation S123 of FIG. 5, the UE 200 may calculate a first phase vector from the first sample vector. Hereinafter, a process of calculating, by the UE 200, a phase vector of the first reference signal is described.

Conjugated complex exponentiations of subcarriers corresponding to N sample times may be represented as a vector of Equation 7.

$$DFT_k(t-\epsilon) = [e^{-i\omega_k(t-\epsilon)} e^{-i\omega_k(t-1-\epsilon)} e^{-i2\omega_k(t-2-\epsilon)} \ldots$$
$$e^{-i\omega_k(t-N+1-\epsilon)}] \quad \text{[Equation 7]}$$

In Equation 7, $DFT_k(t-\epsilon)$ denotes a discrete Fourier transform (DFT) coefficient vector used for an FFT operation of a $k^{th}$ subcarrier having an angular frequency $\omega_k$, and $\epsilon$ denotes a local clock error occurring due to mismatch between a clock of the UE 200 and a clock of the first transmitter 100A. Components of the DFT coefficient vector may rotate on the complex plane according to an increase in $t-\epsilon$.

The UE 200 may perform an inner product on the sample vector represented in Equation 6 and the DFT coefficient vector represented in Equation 7. The UE 200 may extract a phase of each of subcarrier components by performing the inner product operation. The UE 200 may calculate a sum of result values acquired by multiplying each of components of the DFT coefficient vector by each of components of the sample vector through the inner product operation.

The aforementioned operation process may be represented as Equation 8.

$$Y_k = DFT_k(t-\epsilon) \cdot \begin{bmatrix} y_a(t) \\ y_a(t-1) \\ \vdots \\ y_a(t-N+1) \end{bmatrix} \quad \text{[Equation 8]}$$

$$= \sum_{n=0}^{N-1} y_a(t-n) e^{-i\omega_k(t-n-\epsilon)}$$

$$= N \cdot A_k e^{-i(\omega_c+\omega_k)(\tau_{a1}-\epsilon)} + \sigma_a$$

$$\sigma_a = \sum_{n=0}^{N-1} \sum_{q=1}^{m, q \neq k} A_q e^{i((\omega_q-\omega_k)(t-n)-\omega_q\tau_{a1}+\omega_k\epsilon)} \approx 0$$

In Equation 8, $y_a(t)$ denotes data acquired by transforming the first reference signal received at the UE 200 at the time t to the baseband signal, and N denotes a number of components of the sample vector. N may correspond to a size of a summation time interval in the inner product operation. In the typical OFDM system, N may be determined based on a size of an FFT window.

Referring to Equation 8, a result of performing the inner product of $DFT_k(t-\epsilon)$ and $Y_a(t)$ may be represented as a sum of error component $\sigma_a$ and N. $A_k e^{-i(\omega_c+\omega_k)(\tau_{a1}-\epsilon)}$ that is independent at the time t. Here, $\sigma_a$ may degrade positioning precision by acting as an interference component caused by noise and other orthogonal subcarrier components. The UE 200 may ignore $\sigma_a$, through convergence thereof to 0 by averaging values calculated by collecting a plurality of samples. To this end, the UE 200 may acquire a plurality of sample vectors by shifting a start point t of a time interval of the sample vector. If the waveform of the first reference signal continues during the plurality of symbol periods, the UE 200 may easily acquire the plurality of sample vectors. Here, E denotes the local clock error occurring due to mismatch between the clock of the UE 200 and the clock of the first transmitter 100A.

In the aforementioned description, only the $k^{th}$ subcarrier signal having the angular frequency $\omega_k$ is considered. If a first subcarrier group of the first reference signal includes a subcarrier group having angular frequencies of $\omega_1 \sim \omega_m$, Equation 8 may be generalized to Equation 9.

$$Y_A = \begin{bmatrix} Y_1 \\ Y_2 \\ \vdots \\ Y_m \end{bmatrix} = \begin{bmatrix} DFT_1(t-\epsilon) \\ DFT_2(t-\epsilon) \\ \vdots \\ DFT_m(t-\epsilon) \end{bmatrix} \cdot \begin{bmatrix} y_a(t) \\ y_a(t-1) \\ \vdots \\ y_a(t-N+1) \end{bmatrix} = \quad \text{[Equation 9]}$$

$$N \cdot \begin{bmatrix} A_1 e^{-i(\omega_c+\omega_1)(\tau_{a1}-\epsilon)} \\ A_2 e^{-i(\omega_c+\omega_2)(\tau_{a1}-\epsilon)} \\ \vdots \\ A_m e^{-i(\omega_c+\omega_m)(\tau_{a1}-\epsilon)} \end{bmatrix} + \sigma_A$$

In Equation 9, $Y_1, Y_2, \ldots Y_m$ represent an inner product result between the sample vector and the DFT coefficient vector acquired by Equation 9. $\Psi_A$ denotes a vector that includes $Y_1, Y_2, \ldots Y_m$. For example, $\Psi_A$ may be referred to as a first phase vector and $\sigma_A$ denotes an error vector. A phase of components of the phase vector $\Psi_A$ may be proportional to a multiplication of a propagation delay time $\tau_{a1}$ and $(\omega_c+\omega_k)$ that is a sum of an angular frequency of a carrier and an angular frequency of a subcarrier.

A process of calculating, by the UE 200, the first phase vector is described above by referring to Equation 2 to Equation 9. In a similar manner, the UE 200 may calculate the second phase vector.

For example, the second reference signal of the baseband transmitted from the second base station 100B may be represented as Equation 10.

A process of developing the following equations is similar to a process of developing Equation 2 to Equation 9. Therefore, description related to notations that do not require description among notations described in the equations is omitted.

$$B_b(t) = B_1 e^{i\omega_{N-1} t} + B_2 e^{i\omega_{N-2} t} + \ldots + B_m e^{i\omega_{N-m} t} = \sum_{q=1}^{m} B_q e^{i\omega_q t} \quad \text{[Equation 10]}$$

The second base station 100B may modulate the second reference signal of the baseband to a passband signal having an angular frequency $\omega_c$ and may transmit the modulated second reference signal. The modulated second reference signal may be represented as Equation 11.

$$S_b(t) = B_b(t) \cdot e^{i\omega_c t} \quad \text{[Equation 11]}$$
$$= \left( B_1 e^{i\omega_1 t} + B_2 e^{i\omega_2 t} + \ldots + B_m e^{i\omega_N t} \right) \cdot e^{i\omega_c t}$$
$$= \sum_{q=1}^{m} B_q e^{i(\omega_c + \omega_q) t}$$

When the second reference signal transmitted from the second base station 100B arrives at the UE 200 through propagation during time $\tau_{b1}$, the second reference signal received at the UE 200 may be represented as Equation 12.

$$S_b(t-\tau_{b1}) = \sum_{q=1}^{m} B_q e^{i(\omega_c+\omega_q)(t-\tau_{b1})} = e^{i\omega_c(t-\tau_{b1})} \sum_{q=1}^{m} B_q e^{i\omega_q(t-\tau_{b1})} \quad \text{[Equation 12]}$$

The UE 200 may demodulate the received second reference signal of the passband to a baseband signal. For example, the UE 200 may demodulate the second reference signal to the baseband signal using Equation 13.

$$y_b(t) = e^{-i\omega_c(t-\epsilon)} \cdot S_b(t-\tau_{b1}) = e^{-i\omega_c(\tau_{b1}-\epsilon)} \cdot \sum_{q=1}^{m} B_q e^{i\omega_q(t-\tau_{b1})} \quad \text{[Equation 13]}$$

In Equation 13, $\epsilon$ denotes a local clock error. The UE 200 may acquire a second sample vector by converting second reference signals received at a plurality of times to baseband signals. For example, the UE 200 may acquire the second sample vector using Equation 14.

$$Y_b(t) = \begin{bmatrix} y_b(t) \\ y_b(t-1) \\ \vdots \\ y_b(t-N+1) \end{bmatrix} \quad \text{[Equation 14]}$$

In Equation 14, $Y_b(t)$ denotes the second sample vector that includes samples of the second reference signal received at the UE 200 at N sample times. The UE 200 may calculate a second phase vector from the second sample vector using Equation 15.

$$\mathbb{Y}_B = \begin{bmatrix} DFT_1(t-\epsilon) \\ DFT_2(t-\epsilon) \\ \vdots \\ DFT_m(t-\epsilon) \end{bmatrix} \cdot \begin{bmatrix} y_b(t) \\ y_b(t-1) \\ \vdots \\ y_b(t-N+1) \end{bmatrix} = \quad \text{[Equation 15]}$$
$$N \cdot \begin{bmatrix} B_1 e^{-i(\omega_c+\omega_1)(\tau_{a1}-\epsilon)} \\ B_2 e^{-i(\omega_c+\omega_2)(\tau_{a1}-\epsilon)} \\ \vdots \\ B_m e^{-i(\omega_c+\omega_m)(\tau_{a1}-\epsilon)} \end{bmatrix} + \sigma_B$$

In operation S124 of FIG. 5, the UE 200 may calculate a third phase vector from the first phase vector.

The UE 200 may extract a 1-1 partial vector corresponding to a first portion of the first phase vector and a 1-2 partial vector corresponding to a second portion of the first phase vector. For example, the UE 200 may extract the 1-1 partial vector by extracting a desired number of components having a relatively small angular frequency index from the first phase vector. Also, the UE 200 may extract the 1-2 partial vector by extracting a desired number of components having a relatively high angular frequency index from the first phase vector. For example, the UE 200 may extract, from the first phase vector, the 1-1 partial vector having m-1 components having a relatively low angular frequency index and the 1-2 partial vector having m-1 components having a relatively high angular frequency index. In this case, the 1-1 partial vector and the 1-2 partial vector may be represented as Equation 16.

$$\text{Low}(\mathbb{Y}_A(t)) = \begin{bmatrix} A_1 e^{-i((\omega_c+\omega_1)(\tau_{b1}-\epsilon))} \\ A_2 e^{-i((\omega_c+\omega_2)(\tau_{b1}-\epsilon))} \\ \vdots \\ A_{m-1} e^{-i((\omega_c+\omega_{m-1})(\tau_{b1}-\epsilon))} \end{bmatrix} \quad \text{[Equation 16]}$$

$$\text{High}(\mathbb{Y}_A(t)) = \begin{bmatrix} A_2 e^{i((\omega_c+\omega_2)(\tau_{b1}-\epsilon))} \\ A_3 e^{i((\omega_c+\omega_3)(\tau_{b1}-\epsilon))} \\ \vdots \\ A_m e^{i((\omega_c+\omega_m)(\tau_{b1}-\epsilon))} \end{bmatrix}$$

In Equation 16, Low($\mathbb{Y}_A(t)$) denotes the 1-1 partial vector and High($\mathbb{Y}_A(t)$) denotes the 1-2 partial vector. In Equation 16, angular frequency indices of components of the 1-1 partial vector and angular frequency indices of components of the 1-2 partial vector differ by 1. However, it is provided as an example only. For example, angular frequency indices of components of the 1-1 partial vector and angular frequency indices of components of the 1-2 partial vector may differ by 2 or more. Also, although each of the 1-1 partial vector and the 1-2 partial vector includes (m-1) components in Equation 16, it is provided as an example only. For example, each of the 1-1 partial vector and the 1-2 partial vector may include a number of components less than (m-1) components. For example, each of the 1-1 partial vector and the 1-2 partial vector includes only a single component. In this case, each of the 1-1 partial vector and the 1-2 partial vector may include a different component.

The UE 200 may calculate the third phase vector by conjugating the 1-1 partial vector and the 1-2 partial vector. Herein, the expression "conjugating A and B" may represent a multiplication of A and a complex conjugate of B. For example, the UE 200 may calculate the third phase vector using Equation 17.

$$\mathbb{Z}_A = \left( N \cdot \begin{bmatrix} A_1 e^{-i(\omega_c+\omega_1)(\tau_{a1}-\epsilon)} \\ A_2 e^{-i(\omega_c+\omega_2)(\tau_{a1}-\epsilon)} \\ \vdots \\ A_{m-1} e^{-i(\omega_c+\omega_{m-1})(\tau_{a1}-\epsilon)} \end{bmatrix} \right) \quad \text{[Equation 17]}$$
$$\left( N \cdot \begin{bmatrix} A_2 e^{-i(\omega_c+\omega_2)(\tau_{a1}-\epsilon)} \\ A_3 e^{-i(\omega_c+\omega_3)(\tau_{a1}-\epsilon)} \\ \vdots \\ A_m e^{-i(\omega_c+\omega_m)(\tau_{a1}-\epsilon)} \end{bmatrix} \right)^*$$

-continued $$= N^2 \cdot \begin{bmatrix} A_1 A_2^* e^{i(\omega_2-\omega_1)(\tau_{a1}-\epsilon)} \\ A_2 A_3^* e^{i(\omega_3-\omega_2)(\tau_{a1}-\epsilon)} \\ \vdots \\ A_{m-1} A_m^* e^{i(\omega_m-\omega_{m-1})(\tau_{a1}-\epsilon)} \end{bmatrix}$$

In Equation 17, $\mathbb{Z}_A$ denotes the third phase vector. If subcarriers of the first reference signal are arranged at equal intervals in a frequency domain, $\omega_2-\omega_1=\omega_3-\omega_2=\ldots=\omega_m-\omega_{m-1}=\Delta\omega$ may be satisfied. Here, $\Delta\omega$ denotes a subcarrier spacing in the frequency domain. Therefore, if the subcarriers are provided at equal intervals in the frequency domain, Equation 17 may be represented as Equation 18.

$$\mathbb{Z}_A = N^2 \cdot \begin{bmatrix} A_1 A_2^* e^{i\Delta\omega(\tau_{a1}-\epsilon)} \\ A_2 A_3^* e^{i\Delta\omega(\tau_{a1}-\epsilon)} \\ \vdots \\ A_{m-1} A_m^* e^{i\Delta\omega(\tau_{a1}-\epsilon)} \end{bmatrix} \quad \text{[Equation 18]}$$

In operation S125 of FIG. 5, the UE 200 may calculate a fourth phase vector from the second phase vector. The UE 200 may extract a 2-1 partial vector and a 2-2 partial vector from the second phase vector. The UE 200 may calculate the fourth phase vector by conjugating the 2-1 partial vector and the 2-2 partial vector. The fourth phase vector may be represented as Equation 19.

$$\mathbb{Z}_B = N^2 \cdot \begin{bmatrix} B_1 B_2^* e^{i\Delta\omega(\tau_{a1}-\epsilon)} \\ B_2 B_3^* e^{i\Delta\omega(\tau_{a1}-\epsilon)} \\ \vdots \\ B_{m-1} B_m^* e^{i\Delta\omega(\tau_{a1}-\epsilon)} \end{bmatrix} \quad \text{[Equation 19]}$$

In Equation 19, $\mathbb{Z}_B$ denotes the fourth phase vector.

In operation S126, the UE 200 may acquire phase difference information depending on a wavelength of a subcarrier based on the third phase vector and the fourth phase vector. The UE 200 may calculate a conjugate product of the third phase vector and the fourth phase vector. The conjugate product of the third phase vector and the fourth phase vector may be represented as Equation 20.

$$\mathbb{Z}_A \mathbb{Z}_B^* = N^2 \cdot \begin{bmatrix} A_1 A_2^* e^{i\Delta\omega(\tau_{a1}-\epsilon)} \\ A_2 A_3^* e^{i\Delta\omega(\tau_{a1}-\epsilon)} \\ \vdots \\ A_{m-1} A_m^* e^{i\Delta\omega(\tau_{a1}-\epsilon)} \end{bmatrix} \cdot N^2 \begin{bmatrix} B_1 B_2^* e^{i\Delta\omega(\tau_{a1}-\epsilon)} \\ B_2 B_3^* e^{i\Delta\omega(\tau_{a1}-\epsilon)} \\ \vdots \\ B_{m-1} B_m^* e^{i\Delta\omega(\tau_{a1}-\epsilon)} \end{bmatrix}^* \quad \text{[Equation 20]}$$

$$= N^4 \cdot \begin{bmatrix} A_1 A_2^* B_1^* B_2 e^{i\Delta\omega(\tau_{a1}-\tau_{b1})} \\ A_2 A_3^* B_2^* B_3 e^{i\Delta\omega(\tau_{a1}-\tau_{b1})} \\ \vdots \\ A_{m-1} A_m^* B_{m-1}^* B_m e^{i\Delta\omega(\tau_{a1}-\tau_{b1})} \end{bmatrix}$$

The UE 200 may calculate phase difference information using Equation 21.

$$\text{angle}(\mathbb{Z}_A \mathbb{Z}_B^*) = \Delta\omega(\tau_{a1}-\tau_{b1}) = -\Delta\omega\Delta\tau = \theta_g \quad \text{[Equation 21]}$$

In Equation 21, $\theta_g$ denotes phase difference information between the first reference signal and the second reference signal and $\Delta\tau$ denotes a difference between a travel time of the first reference signal and a travel time of the second reference signal. Also, $\Delta\omega$ denotes an interval between subcarriers included in the first reference signal and the second reference signal. Also, an angle function represents a function of outputting a phase angle of a complex component.

Referring to Equation 21, the UE 200 may calculate a phase difference $\theta_g$ depending on $\Delta\tau\alpha$ and $\Delta\omega$ from the third phase vector and the fourth phase vector. Also, since angular frequencies $\omega_1, \omega_2, \ldots \omega_m$ of subcarriers may be determined from $\Delta\omega$, the UE 200 may easily calculate a phase difference depending on an angular frequency of a subcarrier. Also, since a wavelength of a subcarrier is determined based on an angular frequency of the subcarrier, the UE 200 may easily calculate a phase difference depending on a wavelength of each subcarrier.

Since a codomain of the angle function is $-\pi\sim+\pi$ (or $0\sim 2\pi$), an integer ambiguity issue may occur. As described above, as the wavelength of the subcarrier is shorter, it may be more difficult for the UE 200 to determine the integer ambiguity.

In the foregoing description, the UE 200 may calculate the phase difference between the first reference signal and the second reference signal. In a similar manner, the UE 200 may calculate a phase difference between the first reference signal and the third reference signal or a phase difference between the second reference signal and the third reference signal.

To improve positioning precision, the UE 200 may further calculate phase difference information depending on a wavelength of a carrier having a relatively short wavelength.

Referring again to FIG. 4, in operation S130, the UE 200 may calculate a phase difference depending on the wavelength of the carrier. Although operation S130 is included in FIG. 4, operation S130 may be omitted depending on example embodiments. For example, if the positioning precision is sufficiently secured only with a phase difference depending on wavelengths of subcarriers, the UE 200 may omit operation S130.

Figure 6:
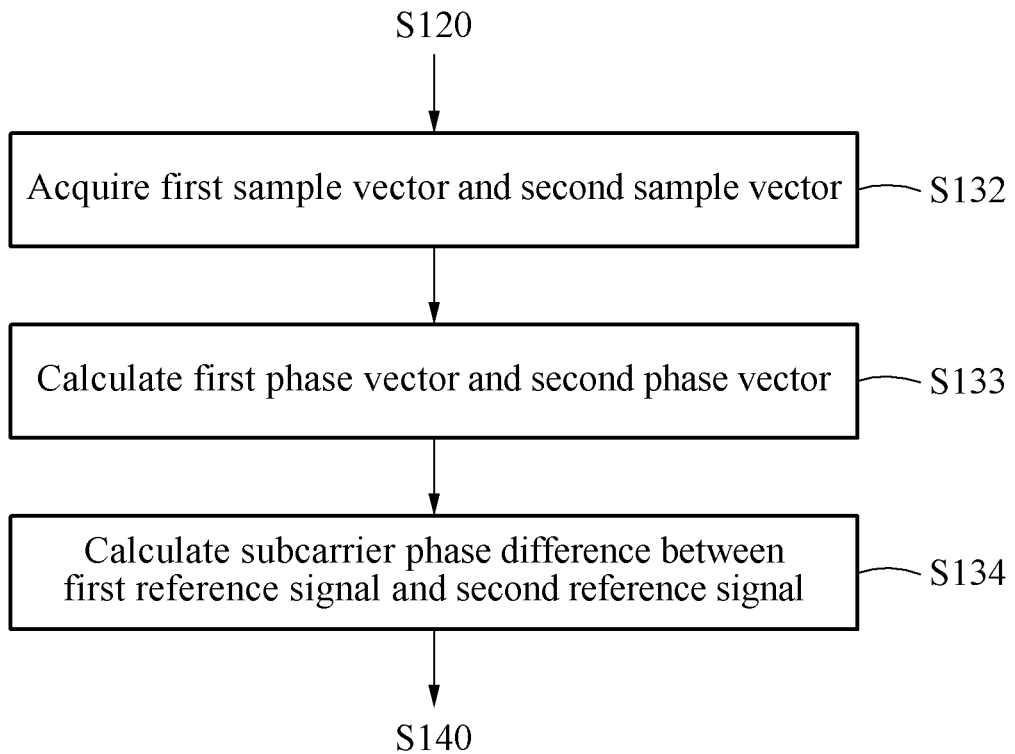
FIG. 6 is a flowchart illustrating an example of a process of performing operation S130 of FIG. 4.

FIG. 6 is a flowchart illustrating an example of a process of performing operation S130 of FIG. 4.

Referring to FIG. 6, in operation S132, the UE 200 may acquire a first sample vector and a second sample vector. Operation S132 of FIG. 6 may be similar to operation S122 of FIG. 5. Therefore, if the first sample vector and the second sample vector are already acquired by the UE 200 in operation S122, operation S132 may be omitted. In operation S133, the UE 200 may acquire a first phase vector and a second phase vector from the first sample vector and the second sample vector, respectively. Operation S133 of FIG. 6 may be similar to operation S123 of FIG. 5. Therefore, if the first phase vector and the second phase vector are already acquired by the UE 200 in operation S123, operation S133 may be omitted.

In operation S134, the UE 200 may calculate a phase difference depending on a wavelength of a carrier of the first reference signal and the second reference signal based on the first phase vector and the second phase vector. The UE 200 may calculate a conjugate product of the first phase vector and the second phase vector using Equation 22.

$$Y_A Y_B^* = N \cdot \begin{bmatrix} A_1 e^{-i(\omega_c+\omega_1)(\tau_{a1}-\epsilon)} \\ A_2 e^{-i(\omega_c+\omega_2)(\tau_{a1}-\epsilon)} \\ \vdots \\ A_m e^{-i(\omega_c+\omega_m)(\tau_{a1}-\epsilon)} \end{bmatrix} \cdot N \cdot \begin{bmatrix} B_1^* e^{i(\omega_c+\omega_1)(\tau_{b1}-\epsilon)} \\ B_2^* e^{i(\omega_c+\omega_2)(\tau_{b1}-\epsilon)} \\ \vdots \\ B_m^* e^{i(\omega_c+\omega_m)(\tau_{b1}-\epsilon)} \end{bmatrix} \quad \text{[Equation 22]}$$

-continued $$= N^2 \cdot \begin{bmatrix} A_1 B_1^* e^{i(\omega_c+\omega_1)(\tau_{b1}-\tau_{a1})} \\ A_2 B_2^* e^{i(\omega_c+\omega_2)(\tau_{b1}-\tau_{a1})} \\ \vdots \\ A_m B_m^* e^{i(\omega_c+\omega_m)(\tau_{b1}-\tau_{a1})} \end{bmatrix}$$

Equation 22 may be represented as Equation 23.

$$\Psi_A \Psi_B^* = N^2 \cdot \begin{bmatrix} A_1 B_1^* e^{i(\omega_c+\omega_1)\Delta\tau} \\ A_2 B_2^* e^{i(\omega_c+\omega_2)\Delta\tau} \\ \vdots \\ A_m B_m^* e^{i(\omega_c+\omega_m)\Delta\tau} \end{bmatrix}, \Delta\tau = \tau_{b1} - \tau_{a1} \quad \text{[Equation 23]}$$

The UE 200 may calculate a phase difference depending on a wavelength of a carrier by applying an angle function to $\Psi_A \Psi_B^*$.

Referring again to FIG. 4, in operation S140, the UE 200 may select a phase difference between reference signals depending on a wavelength of a $k^{th}$ subcarrier. When operation S140 is initially performed, the UE 200 may select a phase difference depending on a wavelength of a first subcarrier having a longest wavelength. The phase difference depending on the wavelength of the first subcarrier may be calculated in operation S120.

In operation S150, the UE 200 may calculate $k^{th}$ estimated coordinates based on the phase difference depending on the wavelength of the $k^{th}$ subcarrier or carrier. A process of calculating, by the UE 200, the $k^{th}$ estimated coordinates is further described with reference to FIG. 7.

In operation S160, the UE 200 may determine whether a termination condition is met. For example, the UE 200 may determine whether the $k^{th}$ subcarrier or carrier is a last component in a preset set. For example, if the $k^{th}$ subcarrier or carrier is the last component of the preset set, the UE 200 may suspend repetition of operations S140, S150, and S160. As another example, the UE 200 may compare $k^{th}$ estimated coordinates calculated from the phase difference depending on the wavelength of the $k^{th}$ subcarrier or carrier and (k−1)-th estimated coordinates calculated from a phase difference depending on a wavelength of a (k−1)-th subcarrier or carrier. For example, when an error between the $k^{th}$ estimated coordinates and the (k−1)-th estimated coordinates is less than a reference error, the UE 200 may determine that a termination condition is met.

Unless the termination condition is met, the UE 200 may calculate integer ambiguity of a phase difference depending on a wavelength of a (k+1)-th subcarrier. The UE 200 may calculate a $k^{th}$ travel distance difference from the phase difference depending on the wavelength of the $k^{th}$ subcarrier. Here, the $k^{th}$ travel distance difference represents a travel distance difference between reference signals calculated from the phase difference depending on the wavelength of the $k^{th}$ subcarrier.

The UE 200 may easily calculate integer ambiguity of a (k+1) phase difference based on a phase difference depending on the wavelength of the $k^{th}$ subcarrier having a wavelength greater than that of the (k+1)-th subcarrier. The UE 200 may increase an index k and may repeat operations S140 and S150 until the termination condition is met. If the termination condition is met, the UE 200 may discover integer ambiguity of a phase difference depending on a wavelength of a subcarrier or a carrier having a sufficiently small wavelength. Also, the UE 200 may discover a position of the UE 200 using the integer ambiguity and the phase difference of the subcarrier or the carrier having the sufficiently small wavelength.

Figure 7:
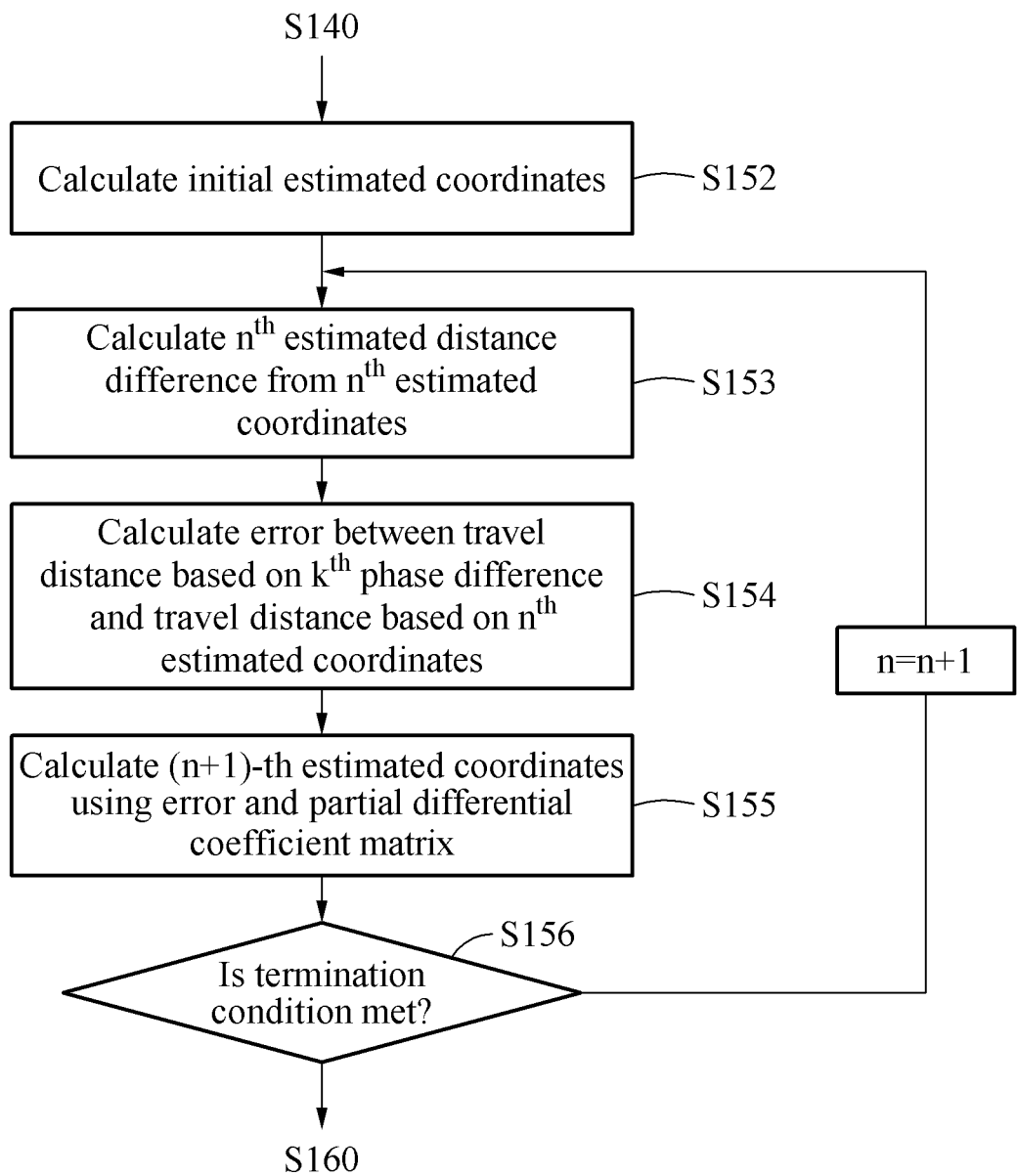
FIG. 7 is a flowchart illustrating an example of a process of performing operation S150 of FIG. 4.

FIG. 7 is a flowchart illustrating an example of a process of performing operation S150 of FIG. 4.

Referring to FIG. 7, in operation S152, the UE 200 may calculate initial estimated coordinates of the UE 200 corresponding to the phase difference depending on the wavelength of the $k^{th}$ subcarrier. For example, the UE 200 may calculate a travel distance difference between reference signals from the phase difference depending on the wavelength of the $k^{th}$ subcarrier. Also, the UE 200 may determine, as initial estimated coordinates, a single arbitrary point in a set of points (e.g., hyperbolic) that satisfy the travel distance difference. As another, the UE 200 may calculate the initial estimated coordinates from the travel distance difference between the reference signals using a triangulation.

The UE 200 may modify the initial estimated coordinates by performing operations S153, S154, and S155. The UE 200 may modify the initial estimated coordinates by repeating operations S153, S154, and S155 until a predetermined termination condition is met. Hereinafter, a method of correcting, by the UE 200, the initial estimated coordinates is described.

When coordinates of the UE 200 are represented as (x, y), a distance between the first base station 100A and the UE 200 is represented as $r_1$, a distance between the second base station 100B and the UE 200 is represented as $r_2$, and a distance between the third base station 100C and the UE 200 is represented as $r_3$, Equation 24 is satisfied.

$$f_{12}(x,y) = \Delta_{12} = r_1 - r_2 = \sqrt{(a_x-x)^2 + (a_y-y)^2} - \sqrt{(b_x-x)^2 + (b_y-y)^2}$$

$$f_{23}(x,y) = \Delta_{23} = r_2 - r_3 = \sqrt{(b_x-x)^2 + (b_y-y)^2} - \sqrt{(c_x-x)^2 + (c_y-y)^2}$$

$$f_{13}(x,y) = \Delta_{13} = r_1 - r_3 = \sqrt{(a_x-x)^2 + (a_y-y)^2} - \sqrt{(c_x-x)^2 + (c_y-y)^2} \quad \text{[Equation 24]}$$

When $n^{th}$ estimated coordinates of the UE 200 are $(x_n, y_n)$, Equation 24 may be represented as Equation 25 using Taylor expansion.

$$\begin{bmatrix} f_{12}(x,y) \\ f_{23}(x,y) \\ f_{13}(x,y) \\ \vdots \end{bmatrix} = \begin{bmatrix} f_{12}(x_n, y_n) \\ f_{23}(x_n, y_n) \\ f_{13}(x_n, y_n) \\ \vdots \end{bmatrix} + \begin{bmatrix} \frac{\partial f_{12}(x_n, y_n)}{\partial x} & \frac{\partial f_{12}(x_n, y_n)}{\partial y} \\ \frac{\partial f_{23}(x_n, y_n)}{\partial x} & \frac{\partial f_{23}(x_n, y_n)}{\partial y} \\ \frac{\partial f_{13}(x_n, y_n)}{\partial x} & \frac{\partial f_{13}(x_n, y_n)}{\partial y} \end{bmatrix} \begin{bmatrix} x - x_n \\ y - y_n \end{bmatrix} \quad \text{[Equation 25]}$$

Referring to Equation 25, a travel distance difference between the reference signals may be represented as a partial differential coefficient matrix (or Jacobian matrix) and an error between actual position coordinates (x, y) and the $n^{th}$ estimated coordinates $(x_n, y_n)$. $f_{12}(x_n, y_n)$, $f_{23}(x_n, y_n)$, may be an $n^{th}$ estimated distance difference calculated from the $n^{th}$ estimated coordinates. In operation S153 of FIG. 7, the UE 200 may calculate the $n^{th}$ estimated distance difference.

Equation 25 may be further simplified as Equation 26.

$$\Gamma = F(P_n) + H(P - P_n) \quad \text{[Equation 26]}$$

In Equation 26, $\Gamma$ denotes a distance difference vector and corresponds to $$\begin{bmatrix} f_{12}(x, y) \\ f_{23}(x, y) \\ f_{13}(x, y) \\ \vdots \end{bmatrix}$$

of Equation 25, P denotes actual position coordinates of the UE 200 corresponds to (x, y) of Equation 25, $P_n$ denotes $n^{th}$ estimated position coordinates of the UE 200 and corresponds to $(x_n, y_n)$ of Equation 25, $F(P_n)$ denotes an $n^{th}$ estimated distance difference vector calculated from the $n^{th}$ estimated position coordinates and corresponds to $$\begin{bmatrix} f_{12}(x_n, y_n) \\ f_{23}(x_n, y_n) \\ f_{13}(x_n, y_n) \\ \vdots \end{bmatrix}$$

of Equation 25, and H denotes a differential coefficient matrix and corresponds to $$\begin{bmatrix} \frac{\partial f_{12}(x_n, y_n)}{\partial x} & \frac{\partial f_{12}(x_n, y_n)}{\partial y} \\ \frac{\partial f_{23}(x_n, y_n)}{\partial x} & \frac{\partial f_{23}(x_n, y_n)}{\partial y} \\ \frac{\partial f_{13}(x_n, y_n)}{\partial x} & \frac{\partial f_{13}(x_n, y_n)}{\partial y} \end{bmatrix}$$

of Equation 25.

In Equation 26, $\Gamma$ may be determined based on a travel distance difference between reference signals. Also, the travel distance difference between the reference signals may be determined based on a phase difference depending on a wavelength of a $k^{th}$ subcarrier or carrier of the reference signals. Therefore, $\Gamma$ of Equation 26 may be represented as Equation 27.

$$\Gamma = \begin{bmatrix} f_{12}(x, y) \\ f_{23}(x, y) \\ f_{13}(x, y) \\ \vdots \end{bmatrix} = \frac{\lambda_{ck}}{2\pi} \begin{bmatrix} \theta_{12} \\ \theta_{34} \\ \theta_{14} \\ \vdots \end{bmatrix}_k + \lambda_{ck} \begin{bmatrix} \mathbb{I}_{12} \\ \mathbb{I}_{34} \\ \mathbb{I}_{14} \\ \vdots \end{bmatrix}_k \quad \text{[Equation 27]}$$

In Equation 27, $\lambda_{ck}$ denotes the wavelength of the $k^{th}$ subcarrier or carrier, $$\begin{bmatrix} \theta_{12} \\ \theta_{34} \\ \theta_{14} \\ \vdots \end{bmatrix}_k$$

denotes a phase difference vector depending on the wavelength of the $k^{th}$ subcarrier or carrier, and $$\begin{bmatrix} \mathbb{I}_{12} \\ \mathbb{I}_{34} \\ \mathbb{I}_{14} \\ \vdots \end{bmatrix}_k$$

denotes an integer ambiguity vector of the phase difference depending on the wavelength of the $k^{th}$ subcarrier or carrier. For example, $\theta_{12}$ denotes a phase difference depending on the wavelength of the $k^{th}$ subcarrier or carrier of the first reference signal and the second reference signal, and $\mathbb{I}_{12}$ denotes an integer ambiguity of the phase difference depending on the wavelength of the $k^{th}$ subcarrier or carrier of the first reference signal and the second reference signal.

Equation 27 may be further simplified as Equation 28.

$$\Gamma = \Psi + \lambda_{ck} \cdot \Lambda \quad \text{[Equation 28]}$$

In Equation 28, $\Psi$ denotes a phase difference vector depending on the wavelength of the $k^{th}$ subcarrier or carrier and corresponds to $$\frac{\lambda_{ck}}{2\pi} \begin{bmatrix} \theta_{12} \\ \theta_{34} \\ \theta_{14} \\ \vdots \end{bmatrix}_k$$

of Equation 27. In Equation 28, $\Lambda$ denotes an integer ambiguity vector of the phase difference depending on the wavelength of the $k^{th}$ subcarrier or carrier and corresponds to $$\begin{bmatrix} \mathbb{I}_{12} \\ \mathbb{I}_{34} \\ \mathbb{I}_{14} \\ \vdots \end{bmatrix}_k$$

of Equation 27.

The UE 200 may calculate the (n+1)-th estimated coordinates $P_{n+1}$ using Equation 29.

$$P_{n+1} = P_n + H^\dagger(\Psi + \lambda_{ck} \cdot \Lambda - F(P_n)), \Gamma = \Psi + \lambda_{ck} \cdot \Lambda \quad \text{[Equation 29]}$$

Referring to Equation 29, $P_{n+1}$ may depend on a difference between $\Gamma$ and $F(P_n)$. Therefore, in operation S154, the UE 200 may calculate an error between a travel distance difference $\Gamma$ based on a $k^{th}$ phase difference and a travel distance difference $F(P_n)$ based on the $n^{th}$ estimated coordinates $P_n$. In operation S155, the UE 200 may calculate $P_{n+1}$ using Equation 29.

In operation S160, the UE 200 may verify whether the termination condition is met. For example, when the error between $P_{n+1}$ and $P_n$ is less than a tolerance, the UE 200 may determine that the termination condition is met. As another example, if n exceeds a preset reference value, the UE 200 may determine that the termination condition is met. The termination condition may be variously set within the range modifiable by those skilled in the art. If the termination condition is not met, the UE 200 may increase an index n and may further perform operations S153, S154, and S155. If the termination condition is met, the UE 200 may perform operation S160 of FIG. 4. The UE 200 may calculate $k^{th}$ estimated coordinates corresponding to a phase difference of the $k^{th}$ subcarrier or carrier by sufficiently repeating operations S153, S154, and S155. Here, the phase difference of the $k^{th}$ subcarrier or carrier may be a phase difference depending on the wavelength of the $k^{th}$ subcarrier or carrier.

Referring again to FIG. 4, in operation S170, the UE 200 may calculate integer ambiguity of a (k+1)-th phase difference based on a $k^{th}$ estimated distance difference that is determined based on the $k^{th}$ estimated coordinates.

The UE 200 may assume that an error between the $k^{th}$ estimated distance difference and a (k+1)-th estimated distance difference that is determined based on the integer ambiguity of the (k+1)-th phase difference is less than a single wavelength. In this case, the UE 200 may calculate the integer ambiguity of the (k+1)-th phase difference using Equation 30.

$$\Lambda_{k+1} = \text{int}\left(\frac{F(P_n) - \Psi_{k+1}}{\lambda_{ck+1}}\right) \approx \left\lfloor \frac{F(P_n)}{\lambda_{ck+1}} \right\rfloor \quad \text{[Equation 30]}$$

$$\therefore \begin{bmatrix} \mathbb{I}_{12} \\ \mathbb{I}_{34} \\ \mathbb{I}_{14} \\ \vdots \end{bmatrix}_{k+1} = \left\lfloor \frac{F(P_n)}{\lambda_{ck+1}} \right\rfloor$$

In Equation 30, $F(P_n)$ denotes a $k^{th}$ travel distance difference that is calculated based on a phase difference depending on a phase of the $k^{th}$ subcarrier or carrier. $\Psi_{k+1}$ denotes a phase vector depending on a wavelength of a (k+1)-th subcarrier or carrier, and $\Lambda_{k+1}$ denotes an integer ambiguity vector of a phase difference depending on the wavelength of the (k+1)-th subcarrier or carrier. The UE 200 may calculate a (k+1)-th integer ambiguity vector based on a result acquired by dividing the $k^{th}$ travel distance difference by the wavelength of the (k+1)-th subcarrier or carrier.

When the termination condition is met in operation S160 of FIG. 4, the UE 200 may determine the $k^{th}$ estimated coordinates finally calculated in operation S150 as position coordinates of the UE 200.

Although FIG. 4 illustrates that all operations S110 to S170 are performed by the UE 200, it is provided as an example only. A portion of operations S120 to S170 may be performed by a base station or another node. For example, the UE 200 may transfer data of the reference signals received in operation S110 to the base station and the base station may perform at least a portion of operations S120 to S170.

A positioning method and apparatus according to example embodiments is described with reference to FIGS. 1 to 7. According to at least one example embodiment, the UE 200 may easily calculate a phase difference depending on a wavelength of a subcarrier or a carrier of reference signals. According to at least one example embodiment, the UE 200 may improve positioning precision by estimating a position of the UE 200 through an iterative operation using a phase difference depending on wavelengths of a plurality of subcarriers or carriers. According to at least one example embodiment, the UE 200 may determine integer ambiguity of a phase difference of a subcarrier or a carrier having a relatively small wavelength based on a phase difference of a subcarrier having a relatively large wavelength. According to at least one example embodiment, the UE 200 may improve positioning precision by modifying an estimated position using a partial differential coefficient matrix.

One of ordinary skill in the art may easily understand that the methods and/or processes and operations described herein may be implemented using hardware components, software components, and/or a combination thereof based on description related to the example embodiments. For example, the hardware components may include a general-purpose computer and/or an exclusive computing device or a specific computing device or a special feature or component of the specific computing device. The processes may be implemented using one or more processors having an internal and/or external memory, for example, a microprocessor, a controller such as a microcontroller and an embedded microcontroller, a microcomputer, an arithmetic logic unit (ALU), and a digital signal processor such as a programmable digital signal processor or other programable devices. In addition, or, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, process, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processors or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A positioning method performed by a user equipment (UE), the positioning method comprising:
   receiving reference signals from a plurality of base stations;
   acquiring phase difference information depending on a wavelength of at least one subcarrier among subcarriers comprised in the reference signals;
   calculating first estimated coordinates of the UE based on first phase difference information depending on a wavelength of a first subcarrier among the subcarriers;
   calculating a first travel distance difference between the reference signals from the first estimated coordinates and estimating integer ambiguity of a second phase difference depending on a wavelength of a second subcarrier from the first travel distance; difference;
   calculating $k^{th}$ estimated coordinates based on $k^{th}$ phase difference information depending on a wavelength of $k^{th}$ subcarrier; and
   calculating a $k^{th}$ travel distance difference from the $k^{th}$ estimated coordinates and estimating integer ambiguity of a (k+1)-th phase difference depending on a wavelength of a (k+1)-th subcarrier from the $k^{th}$ travel distance difference,
   wherein the calculating of the $k^{th}$ estimated coordinates and the estimating of the integer ambiguity of the (k+1)-th phase difference is repeated until a preset termination condition is met, and k denotes a natural number.

2. The positioning method of claim 1, wherein the wavelength of the (k+1)-th subcarrier is shorter than the wavelength of the $k^{th}$ subcarrier.

3. The positioning method of claim 1, further comprising:
   acquiring phase difference information depending on a wavelength of a carrier comprised in the reference signals;
   estimating integer ambiguity of a phase difference depending on the wavelength of the carrier based on a travel distance difference that is acquired from a phase difference depending on a wavelength of a subcarrier having a longest wavelength among the subcarriers; and
   calculating a position of the UE based on a phase difference depending on the wavelength of the carrier.

4. The positioning method of claim 1, wherein the calculating of the $k^{th}$ estimated coordinates comprises:
   calculating initial estimated coordinates of the UE from the $k^{th}$ phase difference information; and
   modifying the initial estimated coordinates through an iterative operation and calculating the $k^{th}$ estimated coordinates.

5. The positioning method of claim 4, wherein the modifying of the initial estimated coordinates and the calculating of the $k^{th}$ estimated coordinates comprises calculating an $n^{th}$ travel distance difference between the reference signals from $n^{th}$ estimated coordinates and calculating (n+1)-th estimated coordinates modified from the $n^{th}$ estimated coordinates based on an error between the $n^{th}$ travel distance difference and a travel distance difference corresponding to the $k^{th}$ phase difference, and
   the calculating of the $n^{th}$ travel distance difference and the calculating of the (n+1)-th estimated coordinates is repeated until a preset termination condition is met.

6. The positioning method of claim 5, wherein the calculating of the $n^{th}$ travel distance difference and the calculating of the (n+1)-th estimated coordinates is repeated until an error between the $n^{th}$ estimated coordinates and the (n+1)-th estimated coordinates becomes to be less than a preset tolerance.

7. The positioning method of claim 5, wherein the (n+1)-th estimated coordinates depend on a product of a partial differential coefficient matrix for a travel distance difference between the reference signals and the error between the $n^{th}$ travel distance difference and the travel distance difference corresponding to the $k^{th}$ phase difference.

8. The positioning method of claim 1, wherein the acquiring of the phase difference information depending on the wavelength of at least one subcarrier among the subcarriers comprises:
   acquiring a first sample vector based on received data of a first reference signal and acquiring a second sample vector based on received data of a second reference signal;
   calculating a first phase vector and a second phase vector by performing an inner product of a discrete Fourier transform (DFT) coefficient vector with respect to each of the first sample vector and the second sample vector;
   calculating a third phase vector by conjugating a 1-1 partial vector corresponding to a first portion of the first phase vector and a 1-2 partial vector corresponding to a second portion of the first phase vector;
   calculating a fourth phase vector by conjugating a 2-1 partial vector corresponding to a first portion of the second phase vector and a 2-2 partial vector corresponding to a second portion of the second phase vector; and
   acquiring phase difference information depending on the wavelength of at least one subcarrier among the subcarriers by conjugating the third phase vector and the fourth phase vector.

9. The positioning method of claim 3, wherein the acquiring of the phase difference information depending on the wavelength of the carrier comprised in the reference signals comprises:
   acquiring a first sample vector based on received data of a first reference signal and acquiring a second sample vector based on received data of a second reference signal;
   calculating a first phase vector and a second phase vector by performing an inner product of a DFT coefficient vector with respect to each of the first sample vector and the second sample vector; and
   acquiring phase difference information depending on the wavelength of the carrier from a conjugate product of the first phase vector and the second phase vector.

10. A positioning apparatus comprising:
    a communicator; and
    a processor configured to connect to the communicator,
    wherein the processor is configured to perform a process of receiving reference signals from a plurality of base stations, a process of acquiring phase difference information depending on a wavelength of at least one subcarrier among subcarriers comprised in the reference signals, a process of calculating first estimated coordinates of a user equipment (UE) based on first phase difference information depending on a wavelength of a first subcarrier among the subcarriers, and a process of calculating a first travel distance difference between the reference signals from the first estimated coordinates and estimating integer ambiguity of a second phase difference depending on a wavelength of a second subcarrier from the first travel distance difference, and
    wherein the processor is configured to further perform a process of calculating $k^{th}$ estimated coordinates based on $k^{th}$ phase difference information depending on a wavelength of a $k^{th}$ subcarrier, and a process of calculating a $k^{th}$ travel distance difference from the $k^{th}$ estimated coordinates and estimating integer ambiguity of a (k+1)-th phase difference depending on a wavelength of a (k+1)-th subcarrier from the $k^{th}$ travel distance difference, and
    the process of calculating the $k^{th}$ estimated coordinates and the process of estimating the integer ambiguity of the (k+1)-th phase difference is repeated until a preset termination condition is met, and k denotes a natural number.

11. The positioning apparatus of claim 10, wherein the wavelength of the (k+1)-th subcarrier is shorter than the wavelength of the $k^{th}$ subcarrier.

12. The positioning apparatus of claim 10, wherein the processor is configured to further perform a process of acquiring phase difference information depending on a wavelength of a carrier comprised in the reference signals, a process of estimating integer ambiguity of a phase difference depending on the wavelength of the carrier based on a travel distance difference that is acquired from a phase difference depending on a wavelength of a subcarrier having a longest wavelength among the subcarriers, and a process of calculating a position of the UE based on a phase difference depending on the wavelength of the carrier.

13. The positioning apparatus of claim 10, wherein the process of calculating the $k^{th}$ estimated coordinates comprises:
    a process of calculating initial estimated coordinates of the UE from the $k^{th}$ phase difference information; and
    a process of modifying the initial estimated coordinates through an iterative operation and calculating the $k^{th}$ estimated coordinates.

14. The positioning apparatus of claim 13, wherein the process of modifying the initial estimated coordinates and calculating the $k^{th}$ estimated coordinates comprises:
    a process of calculating an $n^{th}$ travel distance difference between the reference signals from $n^{th}$ estimated coordinates; and
    a process of calculating (n+1)-th estimated coordinates modified from the $n^{th}$ estimated coordinates based on an error between the $n^{th}$ travel distance difference and a travel distance difference corresponding to the $k^{th}$ phase difference, and
    the process of calculating the $n^{th}$ travel distance difference and the process of calculating the (n+1)-th estimated coordinates is repeated until a preset termination condition is met.

15. The positioning apparatus of claim 14, wherein the process of calculating the $n^{th}$ travel distance difference and the process of calculating the (n+1)-th estimated coordinates is repeated until an error between the $n^{th}$ estimated coordinates and the (n+1)-th estimated coordinates becomes to be less than a preset tolerance.

16. The positioning apparatus of claim 14, wherein the (n+1)-th estimated coordinates depends on a product of a partial differential coefficient matrix for a travel distance difference between the reference signals and the error between the $n^{th}$ travel distance difference and the travel distance difference corresponding to the $k^{th}$ phase difference.

17. The positioning apparatus of claim 10, wherein the process of acquiring the phase difference information depending on the wavelength of at least one subcarrier among the subcarriers comprises:
    a process of acquiring a first sample vector based on received data of a first reference signal and acquiring a second sample vector based on received data of a second reference signal;
    a process of calculating a first phase vector and a second phase vector by performing an inner product of a discrete Fourier transform (DFT) coefficient vector with respect to each of the first sample vector and the second sample vector;

a process of calculating a third phase vector by conjugating a 1-1 partial vector corresponding to a first portion of the first phase vector and a 1-2 partial vector corresponding to a second portion of the first phase vector;

a process of calculating a fourth phase vector by conjugating a 2-1 partial vector corresponding to a first portion of the second phase vector and a 2-2 partial vector corresponding to a second portion of the second phase vector; and a process of acquiring phase difference information depending on the wavelength of at least one subcarrier among the subcarriers by conjugating the third phase vector and the fourth phase vector.

18. The positioning apparatus of claim 12, wherein the process of acquiring the phase difference information depending on the wavelength of the carrier comprised in the reference signals comprises:

a process of acquiring a first sample vector based on received data of a first reference signal and acquiring a second sample vector based on received data of a second reference signal;

a process of calculating a first phase vector and a second phase vector by performing an inner product of a DFT coefficient vector with respect to each of the first sample vector and the second sample vector; and a process of acquiring phase difference information depending on the wavelength of the carrier from a conjugate product of the first phase vector and the second phase vector.

* * * * *